Nov. 16, 1965   H. J. WENGER   3,217,366
SOUND PROJECTING SHELL
Filed Nov. 18, 1959   11 Sheets-Sheet 1

INVENTOR.
HARRY J. WENGER
BY
*Moore, White & Burd*
ATTORNEYS

Nov. 16, 1965 H. J. WENGER 3,217,366
SOUND PROJECTING SHELL
Filed Nov. 18, 1959 11 Sheets-Sheet 3

INVENTOR.
HARRY J. WENGER
BY
Moore, White & Burd
ATTORNEYS

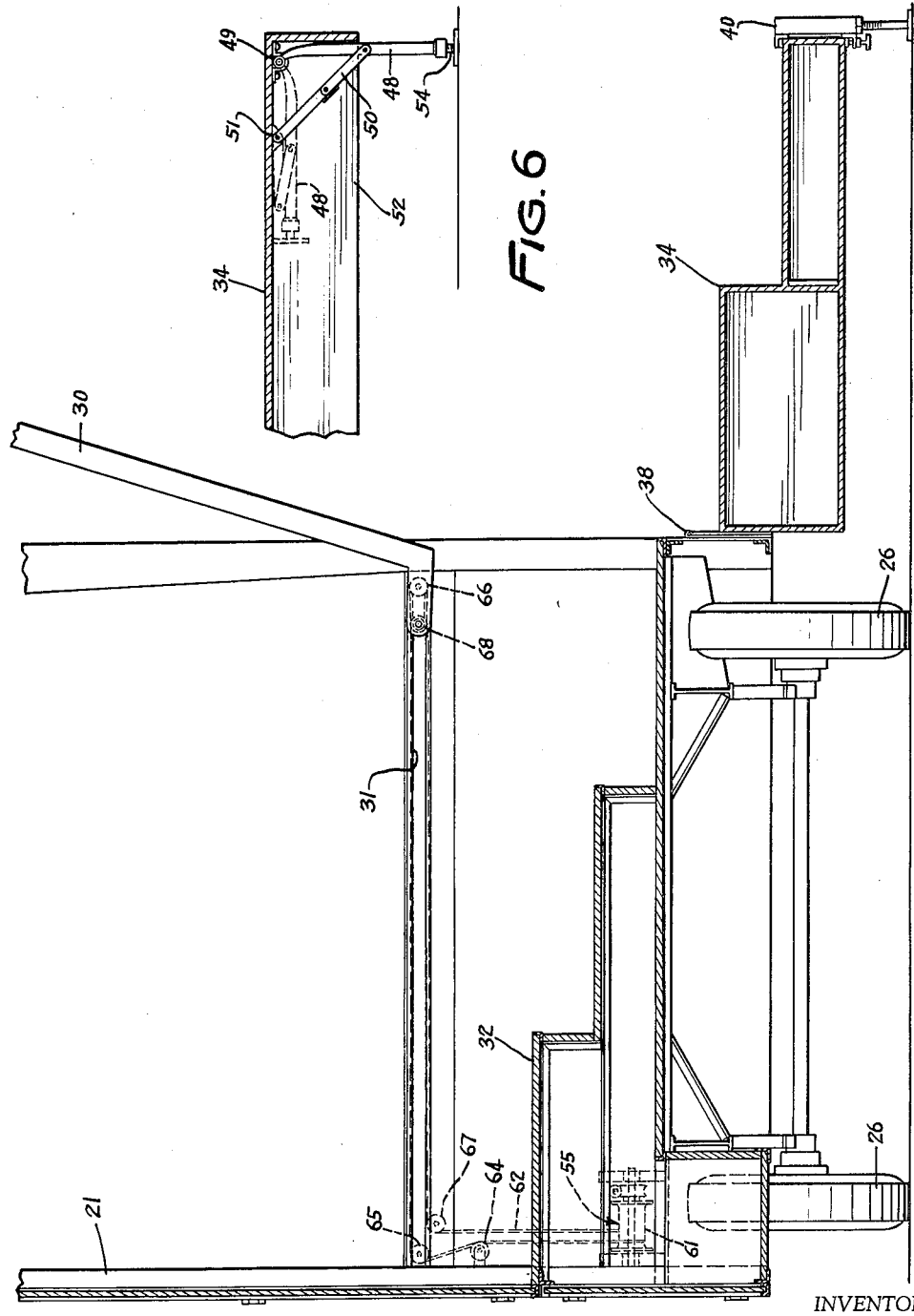

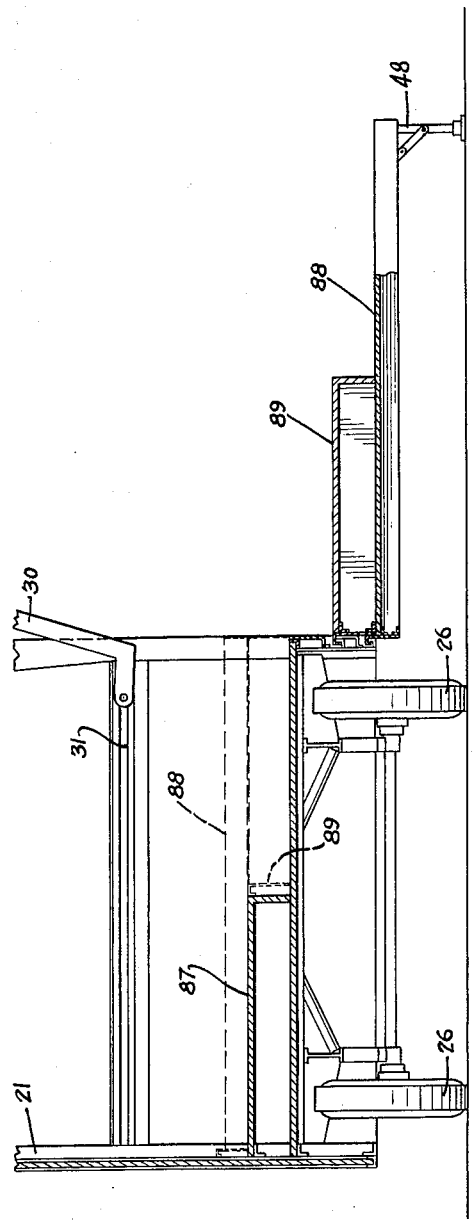
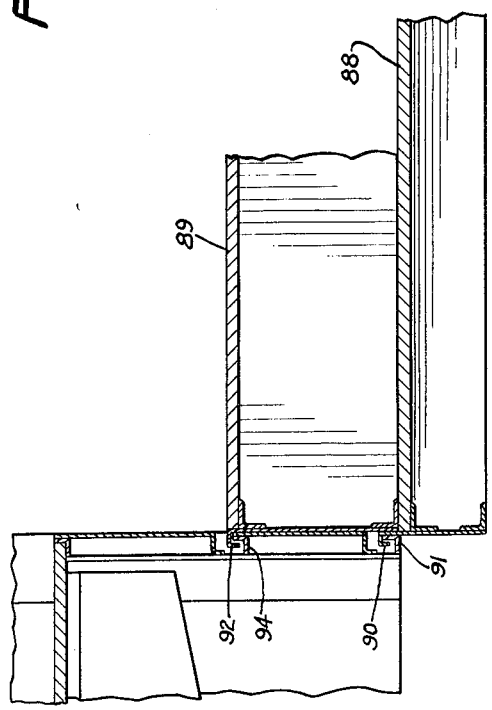

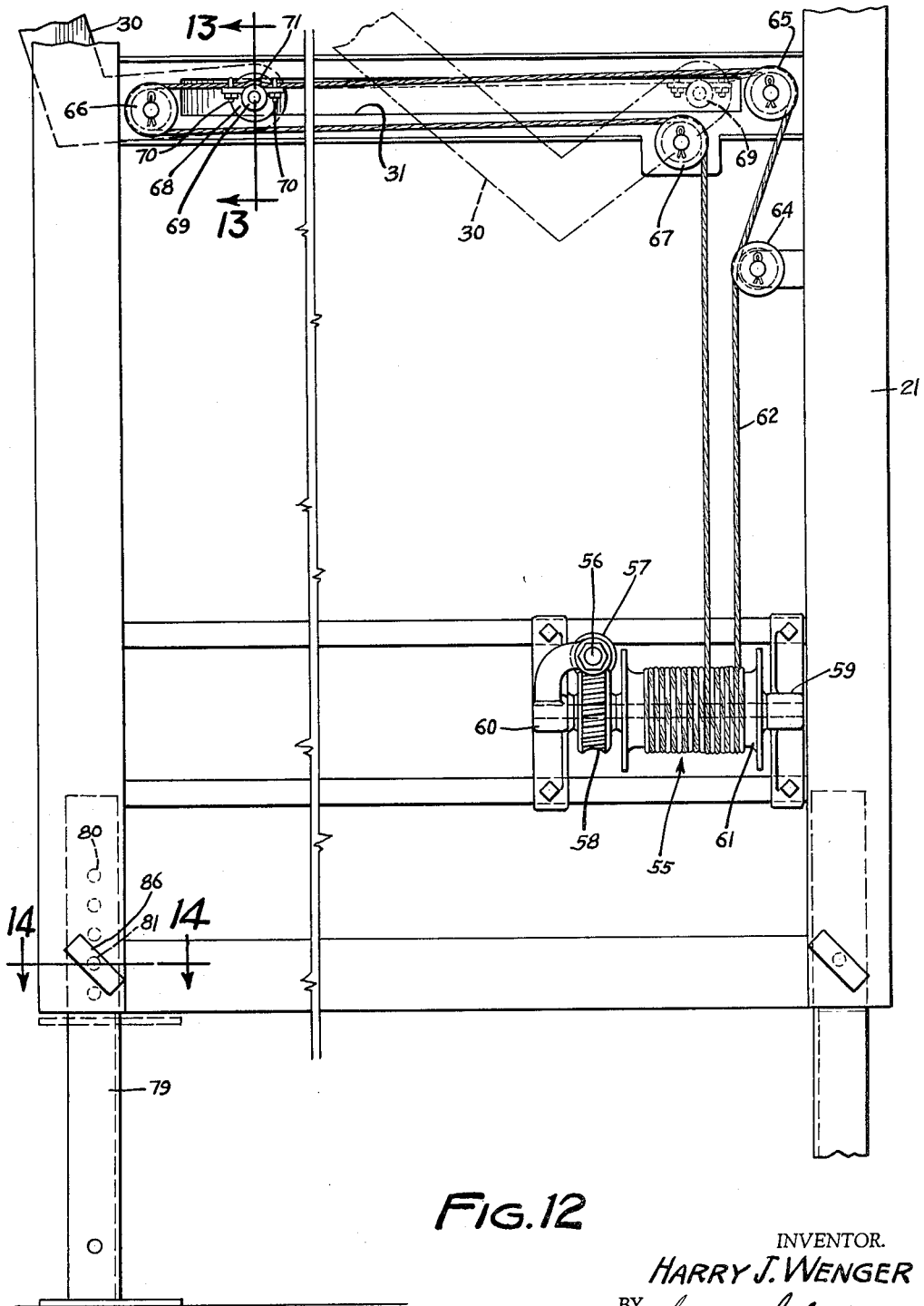

Nov. 16, 1965 H. J. WENGER 3,217,366
SOUND PROJECTING SHELL
Filed Nov. 18, 1959 11 Sheets-Sheet 8

INVENTOR.
HARRY J. WENGER
BY Moore, White & Burd
ATTORNEYS

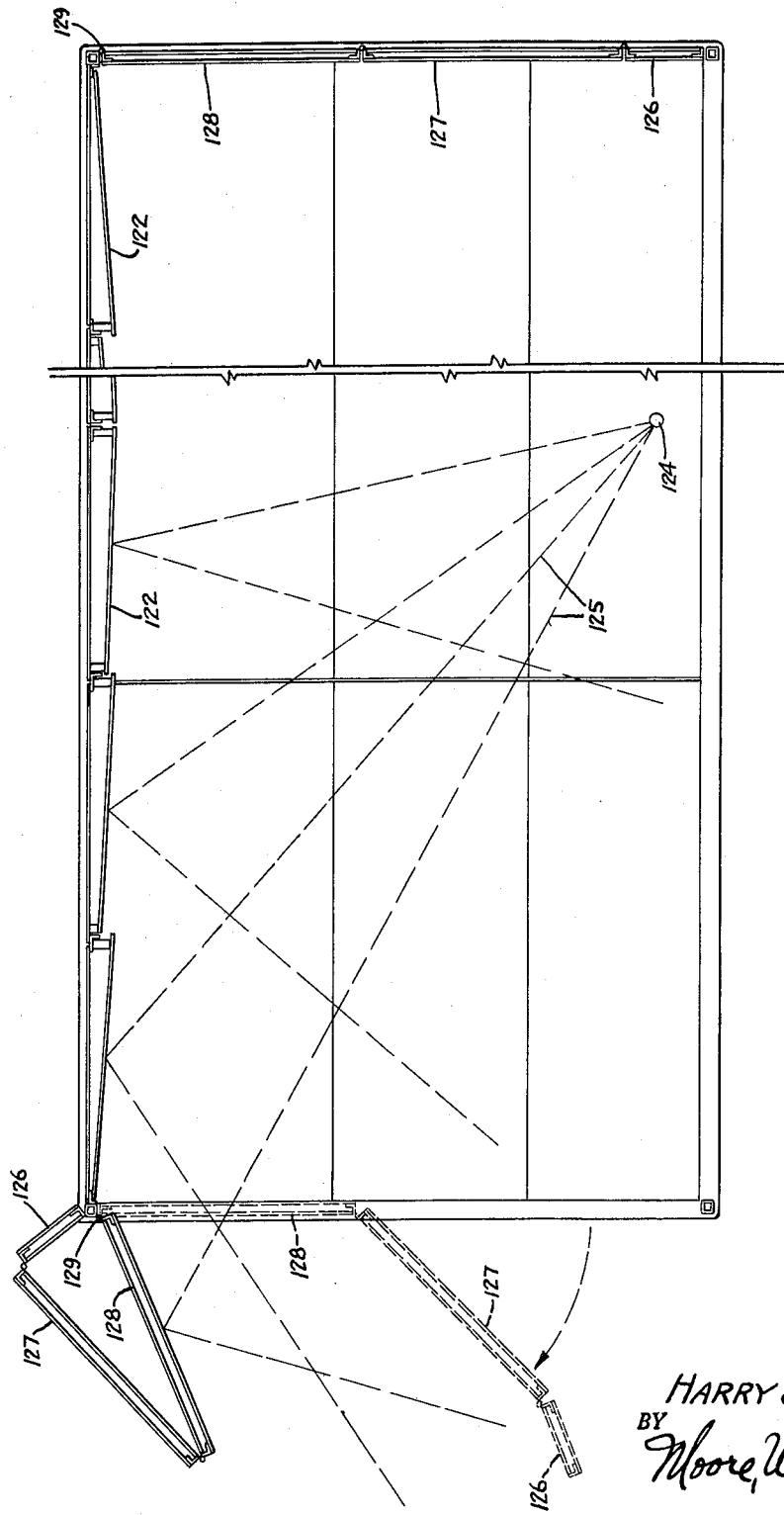

United States Patent Office 3,217,366
Patented Nov. 16, 1965

1

3,217,366
SOUND PROJECTING SHELL
Harry J. Wenger, Owatonna, Minn.
Filed Nov. 18, 1959, Ser. No. 853,896
8 Claims. (Cl. 52—6)

This invention is a portable sound projecting shell of the type generally known as a band shell. It features fixed risers within a portable body and movable risers that can be associated with the fixed risers either in groups to form a continuous series of risers or individually as stairs in a given location. A canopy that closes the unit for transportation can also be opened to more than one position to achieve the most favorable sound projecting effects. The ceiling has supporting structure arranged and constructed to form a sound mixing and projecting chamber. Alternate forms of the device feature sound deflecting movable panels hinged at both the top and the ends in order to provide special sound projecting control, and a unique jack that grips two risers and supports them on a single leg as to join the risers together as a continuous smooth surface though the terrain on which the risers are supported is uneven.

In the past various portable and semiportable structures for supporting musical or choral groups or for serving as portable grandstands have been devised. Also known are portable stages of varying degrees of complexity, none of the prior art, however, has provided a single portable unit incorporating features that make it adaptable to almost every form of portable sound projecting use. Previously known portable choral-supporting units are generally merely the risers without any projecting structure associated with them. Portable stages previously known have been so constructed as to be limited entirely to a flat stage surface. Furthermore, the elevation within these portable stage units precludes the use of risers therewith for musical groups.

In most instances, outdoor sound projecting shells known as band shells have been a fixed construction but usable only on the location where they are constructed. Consequently, these fixed shells cannot be moved to make use of various forms of permanently-located seating arrangements such as stadia and the like for outdoor concerts. Furthermore, seating arrangements for athletic contest are seldom associated with a band shell of fixed construction. Likewise, fixed shells are a relatively expensive investment in that they can only be used in one location and for a limited period of time during the year. Temporary shells erected at the sites of stadia and so forth for particular occasions are both expensive and somewhat unsatisfactory in that the sound projecting portion of the shell, being of temporary construction, is usually not very satisfactory for its purpose.

Accordingly, it is the principal object of this invention to provide a novel portable sound projecting shell.

It is a further object of this invention to provide such a portable sound projecting shell that is extremely flexible in its manner of use.

It is a still further object of this invention to provide such a portable sound projecting shell that may be used either as a band or other musical organization shell or as a stage for other types of productions.

It is a still further object of this invention to provide a sound projecting shell that can be taken to the location of permanent outdoor seating and still provide excellent sound projecting qualities.

Yet another object of this invention is to provide a sound projecting shell that can be adapted to the sound projecting requirements of a particular situation.

It is yet another object of this invention to provide a sound projecting shell that can be stabilized on sloping terrain.

2

A still further object of this invention is to provide a portable sound projection shell that can be closed up when not in use to protect the interior thereof against the elements.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 5 is a fragmentary vertical section in the open position as shown in FIGURE 4 but drawn to the same scale as FIGURE 3; broken lines illustrate hidden parts;

FIGURE 6 is a fragmentary vertical section of the front riser structure showing the preferred form of leg support; adjusted positions of parts are illustrated in broken lines; the scale used in this figure is larger than that employed in FIGURE 3;

FIGURE 10 is a fragmentary vertical section showing use of the preferred riser supporting leg and method of securing the movable risers to the van body; broken lines show adjusted positions of parts; the scale used is the same as that used in FIGURE 4;

FIGURE 11 is a fragmentary enlargement showing the details of the method of securing the movable risers to the band body in the alternate form illustrated in FIGURE 10; the scale used is that of FIGURE 7;

FIGURE 12 is a fragmentary end elevation with the end panel removed and a portion of the structure deleted to conserve space; broken lines illustrate hidden parts while irregular broken lines illustrates an adjusted position of parts; the scale used is larger than that used in FIGURE 7;

FIGURE 15 is a fragmentary vertical section of an alternate form of canopy with broken lines illustrating adjusted positions of parts; the scale used is larger than that of FIGURE 3 but smaller than that of FIGURE 7;

Figure 4:
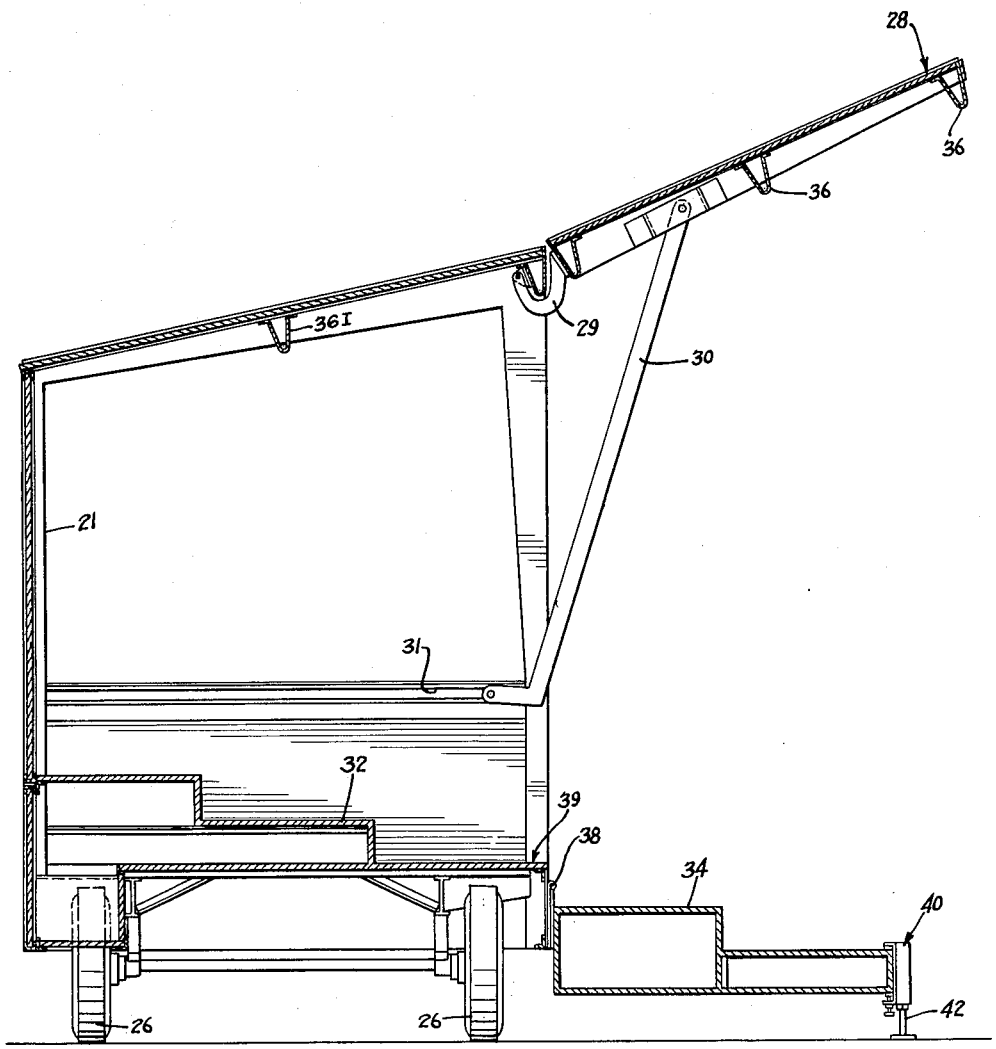
FIGURE 4 is a vertical section drawn to a scale smaller than FIGURE 3 but larger than FIGURES 1 and 2 showing the canopy open and the movable risers extended; hidden parts are illustrated in broken lines.
Figure 18:
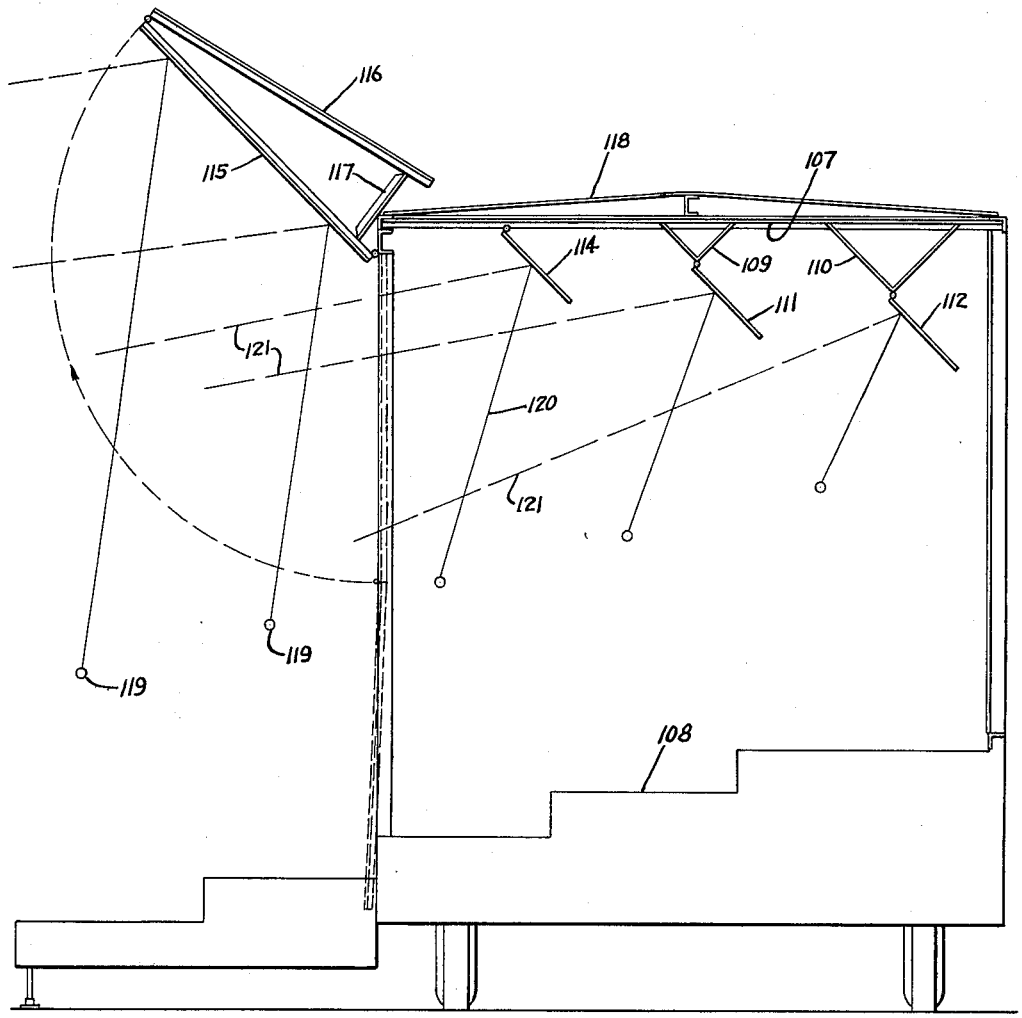

FIGURE 18 is a vertical section similar to the view shown in FIGURE 4 and drawn to the same scale showing a modified form of sound blending and projecting structure as well as a modified form of canopy; broken lines illustrate adjusted positions of parts; and FIGURE 19 is a horizontal section taken through a modified form of shell showing an adjustable sound projecting end panel and drawn to the same scale as FIGURE 4; broken lines illustrate adjusted positions of parts and dash lines illustrates projection of sound.

Figure 1:
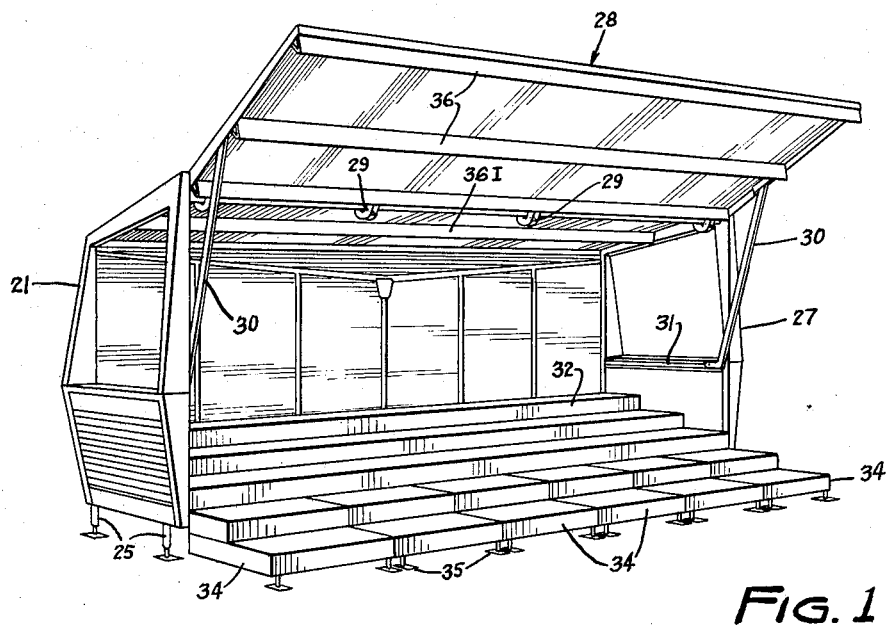
FIGURE 1 is a perspective view of one form of the sound projecting shell open and ready for use as a complete set of risers.
Figure 2:
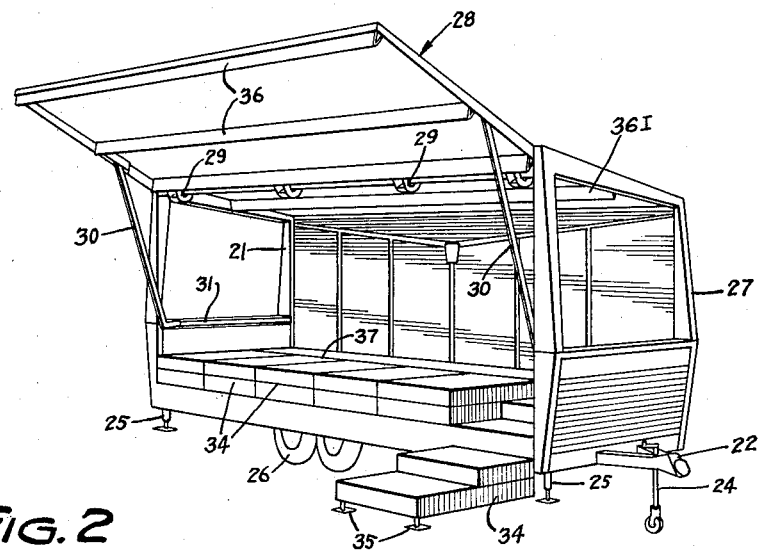
FIGURE 2 is a view drawn to the same scale as FIGURE 1 shown from the opposite end in perspective and with only one section of risers extended.

In FIGURES 1 and 2 an embodiment of the invention is illustrated showing a trailer body designated 21 having usual towing hitch 22 and retractible front supporting wheel 24. Also provided are integral stabilizing jacks 25. Suitable wheel structure such as a tandem wheel 26 may be provided.

Sturdy bridge-type framing ends 27 provide the strength both to support adequately the sloping roof and also the movable canopy generally designated 28. These ends also provide space in which to place the operating mechanism for raising and lowering the canopy, which mechanism will be described in detail below. In general, however, the canopy is raised by being pivoted to the roof by the special hinges 29 and the two supportnig arms 30 which slide at their lower ends in track 31.

Figure 3:
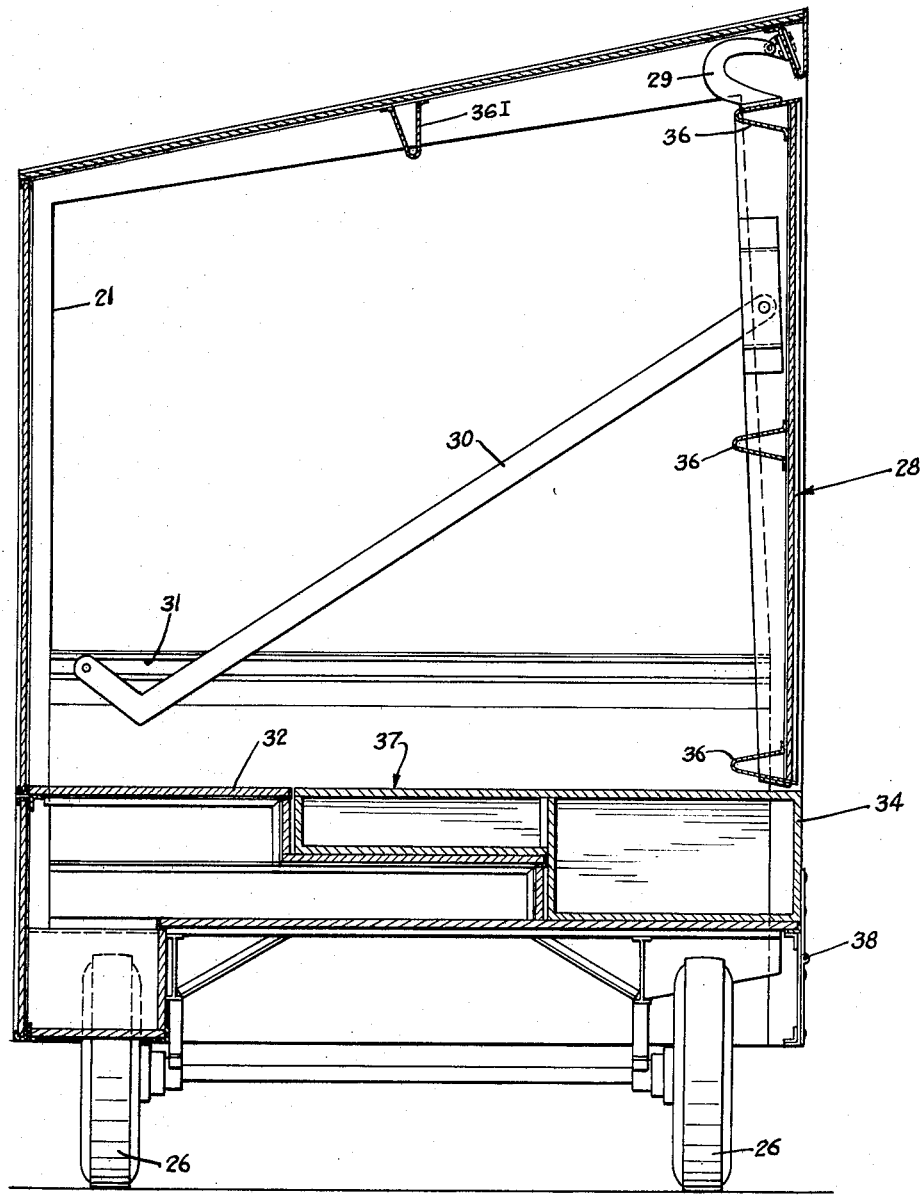
FIGURE 3 is a vertical section drawn to a scale larger than FIGURES 1 and 2 and with broken lines illustrating hidden parts.

The interior floor of the portable shell comprises a series of fixed risers designated 32. As shown in FIGURE 2 and cooperating with the fixed risers 32 are a plurality of short movable risers 34 that may be used to form a flat platform or a further series of risers in front of the fixed risers. As shown in these two figures, the front end of each movable risers is supported by the preferred form of adjustable jacks 35 which are formed integrally with the risers. These jacks may be adjusted vertically in order to support in level conditions the movable risers even though the ground on which the shell is positioned is uneven. The sloping roof is braced by a longitudinal beam designated 36I which is of V configuration in section as shown in FIGURE 3 to serve several functions. This longitudinal brace is very strong by reason of its configuration and also serves as a sound baffle to form a mixing and blending chamber along with similar braces 36 from the canopy. Thus, an orchestra, chorus, or other musical ensemble performing in the shell will have its total sound blended before being projected to the audience.

These V configuration longitudinal beams also serve, when desired, as light shields. Conventional lights placed behind them are shielded from the eyes of the audience and at the same time have the light therefrom deflected down onto the performers' music or other scripts so that they may be seen well.

As can be determined by an examination of FIGURES 1 and 2 and in more detail than the other figures of the application, the extremely sturdy frame of the shell is adequate to support a plywood exterior which is known to be excellent sound projecting material by reason of its great density, smoothness, and resonance. As seen in FIGURE 2, not all of the movable risers need be extended at one time.

As shown clearly in FIGURE 3, the movable risers 34 cooperate with the fixed risers 32 when folded to form a flat platform or staging surface indicated at 37 in both FIGURES 2 and 3. It will also be observed in FIGURE 3 that canopy 28, that is open when in use, closes a side of the shell down to the top edge of the movable riser as positioned in the shell van.

FIGURE 4 illustrates the canopy in a raised position in more detail wherein it may be seen that the canopy can be elevated to an angle of about 25° above the horizontal. This position of the canopy is considered most advantageous when playing to a crowd seated on a hillside or otherwise elevated in part above van level. As the mechanism for raising and lowering the canopy will hold the canopy in any elevated position, it may be stopped below the angle shown in FIGURE 4 to better project sound out to an audience sitting on a level field, for example. FIGURE 4 also illustrates in more detail how the movable risers 34 may be hinged to the van body with a piano-type hinge indicated at 38. The hinged point of this hinge will be seen to about center between the edge of the lowest fixed riser indicated at 39 of FIGURE 4 and the top rear edge of the movable riser 34. Thus, when the movable riser is hinged up and into the van as shown in FIGURE 3 the risers fit together neatly to form a flat top surface 37 for the stage.

A different form of leveling jack from that disclosed in FIGURES 1 and 2 is shown attached to the front end of the risers and designated 40.

Figure 7:
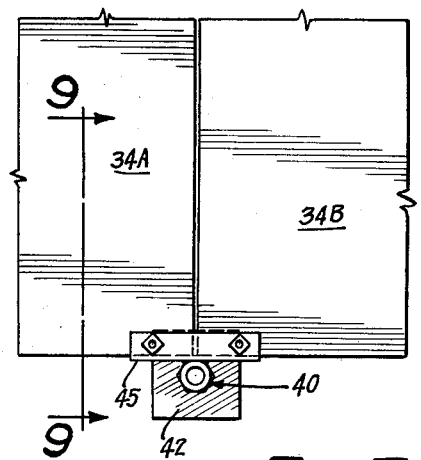
FIGURE 7 is a fragmentary plan view of the joint between two movable risers showing the attachment of an alternate form of supporting leg thereto with broken lines illustrating hidden parts; the scale used is larger than that used in FIGURE 6.
Figure 8:
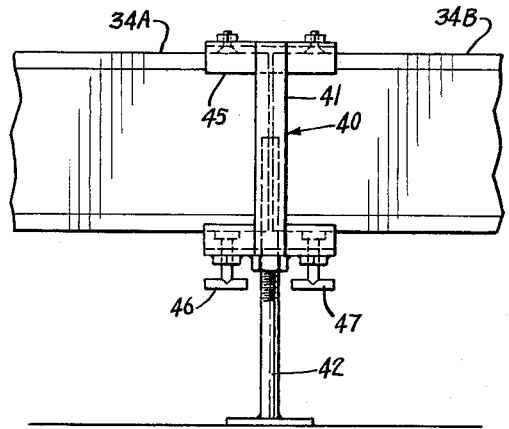
FIGURE 8 is a front elevation of the same fragment shown in FIGURE 7 and drawn to the same scale; again broken lines illustrate hidden parts.
Figure 9:
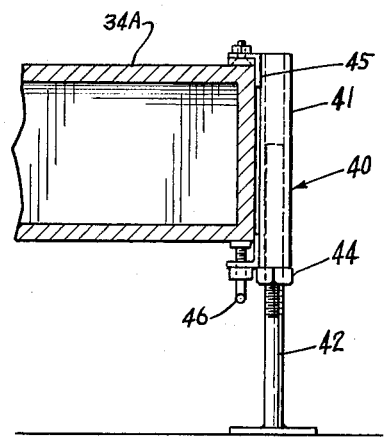
FIGURE 9 is a vertical section of the same fragment shown in FIGURE 7 and drawn to the same scale being taken on the line 9—9 of FIGURE 7; broken lines illustrate hidden parts.

FIGURES 7, 8, and 9 show the details of jack 40 wherein it may be seen that a tube 41 telescopically receives the jack leg 42. Any suitable adjusting thread means such as the one 44 permits the controlled telescoping of leg 42 within tube 41. Secured to tube 41 is the fixed uni-planar jaw 45 and below it a pair of adjustable individual clamping jaws 46 and 47. The two fragments of front risers illustrated in FIGURES 7 and 8 are designated 34A and 34B, respectively, and it can be seen by examining FIGURES 7 and 8 that the uni-planar jaw engages both of the two movable riser top surfaces to hold them in alignment with each other. The lower adjustable clamping jaws 46 and 47 may then be set to engage properly the underside of these two risers and force the risers separately into form engagement with uni-planar jaw 45. This jack means provides a means for avoiding minor variations in the height of two adjacent risers even though the risers are not identical in thickness from top to bottom, and even though the ground is uneven.

The alternate form of supoprting leg illustrated in FIGURES 1, 2, and 6 shows a jack tube 48 secured hingedly as at 49 to the front of the front riser 34. A folding brace 50 is pivoted to both the jack tube 48 and to the inside top of the riser as shown at 51. This jack leg may be folded into the open bottom 52 of the riser when not in use. Jack tube 48 telescopically accommodates a jack element 54 which may be adjusted in any of several heights to level the riser front edge with respect to the rest of the structure.

In broken lines in FIGURE 5 may also be seen the winch structure 55 which is used for raising or lowering the canopy. This structure is mounted in the thick end of the van body and is shown in more detail in FIGURE 12. In that figure a socket engaging element 56 is shown secured to a worm 57 that engages operably a worm gear 58. Gear 58 is pinned to a shaft that is rotatably mounted in the bearings 59 and 60. Also secured to the shaft is the winch drum 61 on which is wound the endless cable 62. Cable 62 is reeved around a series of pulleys designated 64, 65, 66, and 67 and from thence back to the winch drum 61. Pulleys 65 and 66 guide a portion of the cable beside the track 31 within which the roller 68 moves. This roller 68 is rotatably secured to the lower end of arm 30. Cable 62 is secured to the cable clamp on the shaft 69 of the roller 68 by appropriate means such as the U-bolt and nut assemblies 70. A kink as shown at 71 is thereby formed in cable 62 over cable clamp 69 which secures the cable to the bearing block. By engaging an appropriate socket drive to the socket receiving means 56 therefore, the winch may be turned in either direction to cause the cable to move with respect to the sheaves 64 through 66, thereby carrying the end of arm 30 from the position shown in solid lines to the irregular broken-line position shown in that same figure.

Figures 13, 14:
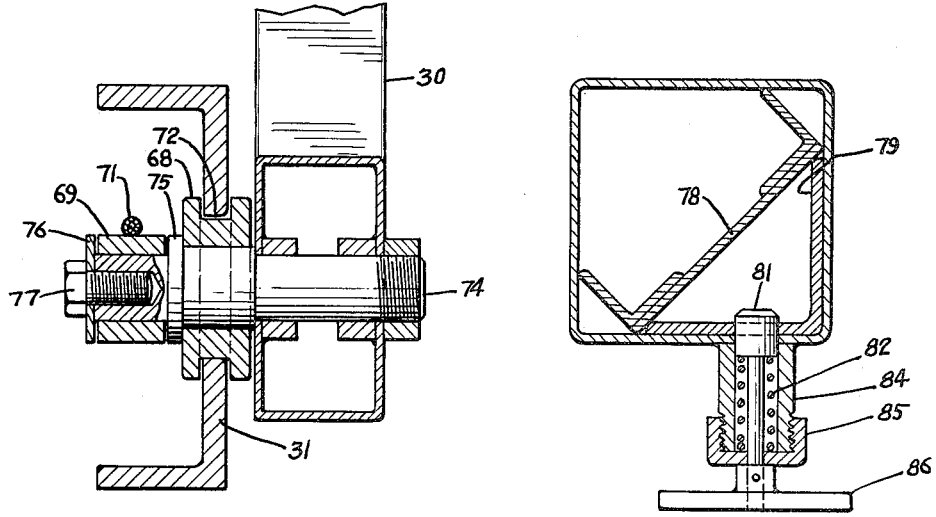
FIGURE 13 is a vertical section taken on the line 13—13 of FIGURE 12 and drawn to a substantially larger scale than FIGURE 12.
FIGURE 14 is a horizontal section taken on the line 14—14 of FIGURE 12 and with broken lines illustrating hidden parts; the scale used in this figure is larger than that of FIGURE 12 but smaller than that of FIGURE 13.

In this connection it should be noted that sheave 65 is positioned slightly higher than sheave 66 so that the portion of the cable carrying the roller 68 is moved down to engage the bottom of track 31 when the canopy is being raised and may move up in response to a lifting action as the canopy reaches its lowered position. As shown in FIGURE 13, the roller 68 is slightly smaller in its track engaging diameter than the slot in track 31. For this reason the roller only bears on one surface of the track at any given moment, thereby making it possible for it to rotate freely in response to engagement with the track. The clearance between the top of track 31 and the top of roller 68 is shown clearly in FIGURE 13 at 72.

As also shown in the enlarged detail showing, FIGURE 13, the shaft 74 is rigidly secured to arm 30. This provides a suitable stable bearing for the roller 68 which is captured between the arm 30 and the shoulder 75 on shaft 74. Cable clamp 69 is pivotally secured on the end of shaft 74 beyond collar 75 by means of a suitable washer or collar 76 held in place in any suitable manner as by the cap screw 77. The great gear reduction found in the worm-type winch provides means by which canopy 28 may be stopped in any intermediate position desired and held there. Additional locking means may be provided if that seems either necessary or desirable.

Also shown in FIGURE 12 are the stabilizing jacks 25 which consist of special fabricated legs 78 that telescope within the end tubes, in FIGURE 14 designated 79, of the frame. The telescoping leg members are provided with a plurality of vertically spaced holes such as those designated 80 in FIGURE 12 into which a positive lock plug 81 may slide. This positive lock is spring loaded to engage holes 80 by suitable means such as the coil spring 82 contained within the housing 84 and held there by cap 85. Spring 82 bears on the top end of lock plug 81 and the cap 85 to bias the lock toward the holes 80. A suitable means in the form of handle 86 is provided for withdrawing the lock in order to adjust leg 25.

FIGURES 10 and 11 illustrate a different method of securing the movable risers to the band body. In those figures the fixed risers 87 within the band body comprise only two steps, and the movable risers are independently movable. The long lower movable riser is designated 88 while the shorter movable riser is designated 89. In at least one way the structure provides even greater flexibility than does the hinged form of riser illustrated previously. As shown in FIGURE 10, the narrow movable riser 89 may be left in the band body, thereby creating only two risers with a substantial difference in elevation between them. Furthermore, both risers will both be of considerable width. In the alternative the riser 89 may be taken out of the van and placed on top of the riser 88 to form a series of four levels. As is shown more clearly in FIGURE 11, the riser 88 is provided with a hook 90 that engages a cooperating hook structure 91 on the open side of the van body. Hook 90 engaging with the hook 91 not only holds riser 88 adjacent to the van body but also supports the inner end thereof. An adjustable supporting leg such as the one illustrated in FIGURE 6 is shown supporting the outer end of riser 88. The riser 89 is secured by a hook designated 92 engaging the hook 94 of the van body to hold it close to the van body to prevent its sliding forward from riser 88. The hooks 90 and 92 are continuous along the edges of risers 88 and 89, respectively, so as to leave no break in the surface presented by the risers 87 and 89 used as shown with the riser 89 in the broken lines position in FIGURE 10. When transporting the device as illustrated in FIGURES 10 and 11, risers 88 and 89 are placed in the van as shown in broken lines.

Figure 16:
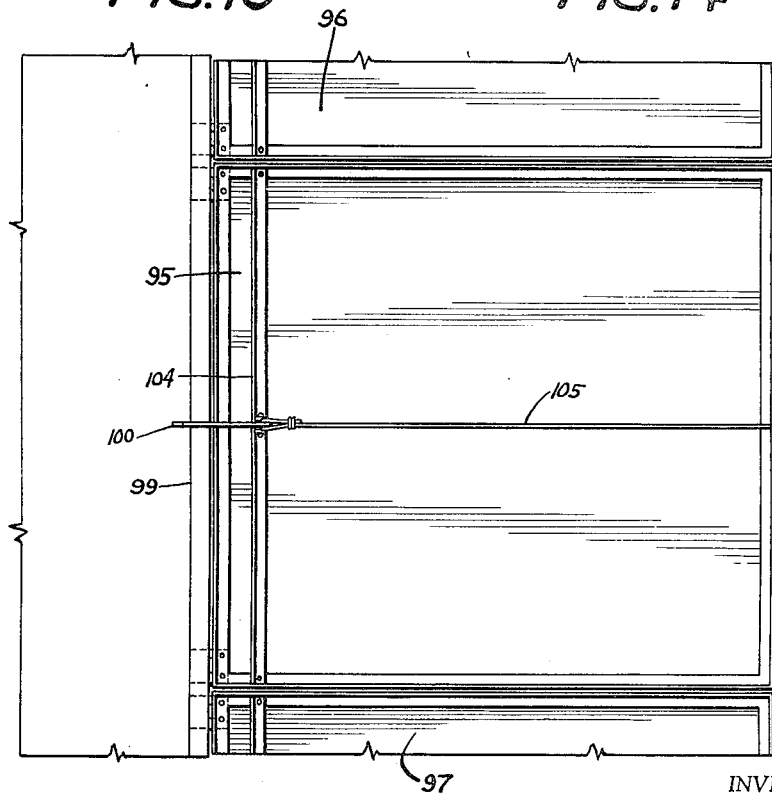
FIGURE 16 is a fragmentary plan view taken on the line 16—16 of FIGURE 15 and drawn to the same scale as that figure; broken lines illustrate hidden parts.
Figure 17:
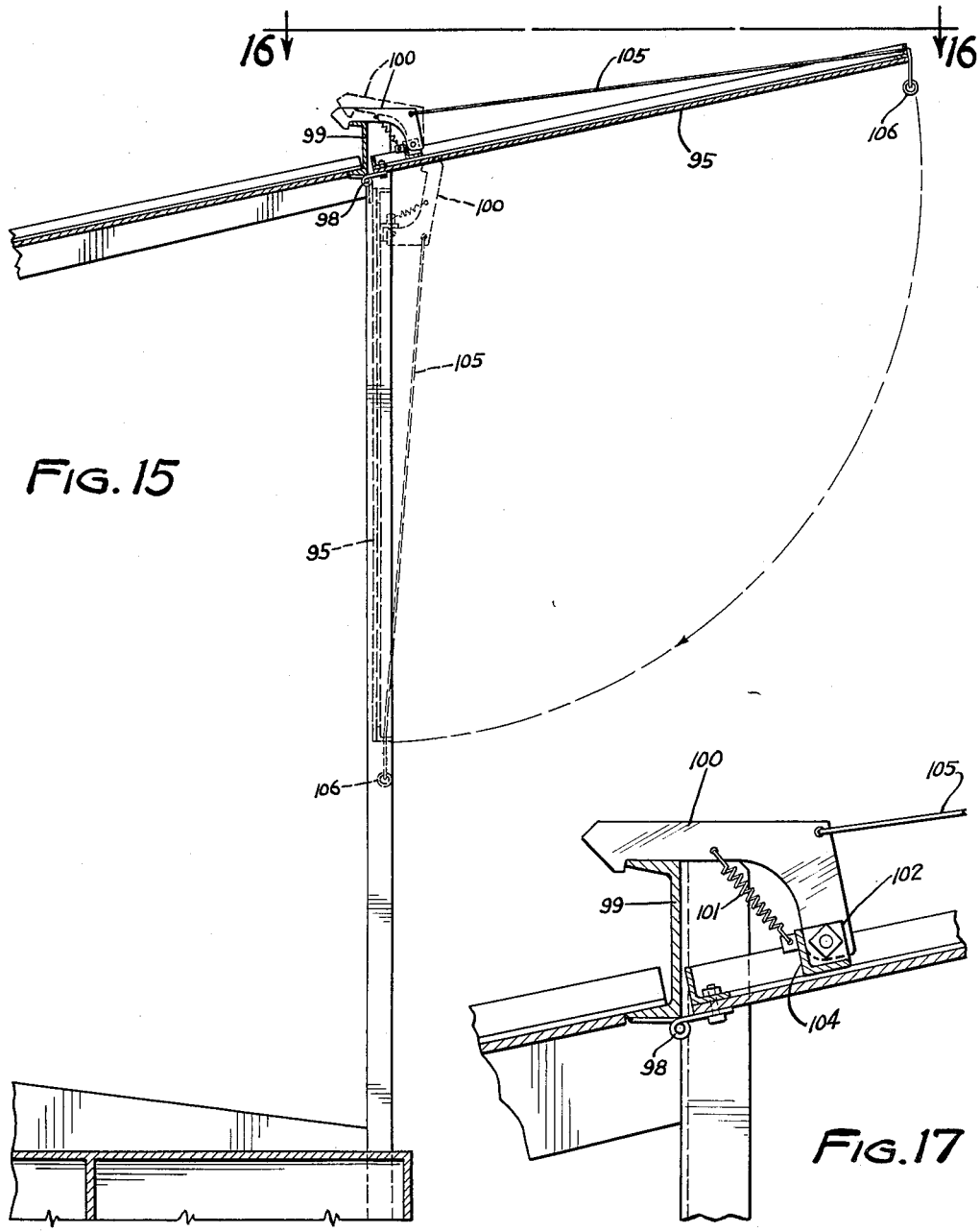
FIGURE 17 is an enlarged fragmentary detail showing the latch mechanism illustrating FIGURE 15; broken lines illustrate hidden parts and the scale used is larger than that for FIGURE 12 but smaller than that of FIGURE 14.

In FIGURES 15, 16, and 17, particularly in FIGURE 16, is illustrated an alternate form of canopy made up of sections such as the one 95 and the fragments or sections adjacent thereto designated 96 and 97. Each one of these sections is separately hinged to the top front of the van body as shown in FIGURE 17 at 98. Also a rigid metal member such as the one designated 99 in FIGURE 17 is provided to both strengthen the front of the van body at its top and also to provide a surface on which a catch 100 can engage; catch 100 being biased into a latching position in a suitable manner as by the spring 101. Latch 100 is pivotally secured to the canopy section by any suitable means such as the bracket 102 rigidly secured to the canopy brace 104. A suitable means such as the flexible element 105 having a suitable terminal piece such as ring 106 is used to pull latch 100 into a release position as shown by the broken lines in FIGURE 15. A divided canopy of this type has the advantage of permitting some of the sides of the van to be open while leaving others closed as to provide a variety of size openings as for puppet shows or the like.

In FIGURE 18 a modified form of the van body is shown in section in which the ceiling 107 is substantially parallel to the top planes of the fixed risers 108. Secured to the inside ceiling are the V-shaped beams 109 and 110. These bracing beams support hinged sound deflectors 111 and 112, respectively. A similar hinged sound deflector 114 is secured directly to the ceiling 107 at the forward open side of the shell. As the sound deflectors are very light, a friction-type hinge will hold them in any adjusted position to which they are manually set. The side closing canopy is made in two sections designated 115 and 116, respectively. When they are open they are held in spaced relation in their nonjoined ends by a removable brace designated 117. When the canopy is opened completely, brace 117 may be engaged by any suitable conventional latch similar to the one shown in FIGURE 17 only operating in a nearly horizontal plane and secured to the roof 118 of the van. Circle points 119, FIGURE 18 represent the point of origination of sound as where a band player's instrument would be held which, in part, is projected upward, as is shown by the solid light lines, and then projected forward, as shown by the broken lines 121. Adjustments of the sound deflectors 111, 112, and 114 can produce some variation in how the sound is projected, depending upon whether the audience is large or small and placed on elevated or level surfaces.

In FIGURE 19 is shown the fragmentary plan view of a modified interior for a portable sound shell. In that view the slanting back panels 122 are shown to deflect sound laterally from a point of sound origination 124 as shown by broken lines 125. Also illustrated in that figure is an alternate form of end for the portable shell in which the end is jointed in three segments designated 126, 127, and 128 which are hinged together and to the rear end of the shell as at 129 to form a similarly slanting end flap that will direct some of the sound projecting laterally in a more forwardly direction. Actually, the end 126, 127, and 128 can be positioned variously to deflect the sound as desired. It may be even left in a completely end enclosing position as shown at the right hand side of the figure if the audience for which a performance being given is small.

Features such as those illustrated in FIGURES 18 and 19 may, of course, be used in conjunction with structures such as those illustrated in FIGURES 1 and 2; likewise, structure as illustrated in FIGURES 15, 16, and 17 may be combined with structure shown elsewhere.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A sound projecting shell comprising, a wheeled van open at one side, a plurality of fixed risers secured therein, a series of individually movable risers shorter than said fixed risers engaged with and positioned adjacent to said fixed risers selectively to form a flat stage and consecutive risers alternately, a canopy hinged to said van at the top of its open side, and means for opening, supporting in an open position, and closing said canopy selectively; said means comprising, arms pivoted to said canopy, tracks secured to said van, said arms having ends slidably engaging said tracks, sheaves positioned near said tracks, cables reeved over said sheaves, means securing said cables to the arm ends in said tracks, and a winch for moving said cable in two directions.

2. The sound projecting shell of claim 1 in which said sheaves are higher at one end of said tracks than the other whereby said cables slant with respect to said tracks.

3. A canopy for a sound projecting trailer comprising, a frame pivoted to one upper edge of the trailer side, a pair of tracks mounted on the inside ends of said trailer, a pair of lifting arms each having an end slidably engaging one of said tracks, the other ends of said lifting arms pivoted to said canopy frame, means secured to said lifting arms near their sliding ends for sliding said lifting arms on said tracks selectively in both directions, said sliding means capable of holding said canopy in at least two selective raised positions, and means covering said frame, said sliding means comprising a plurality of sheaves near said tracks, a cable reeved over said sheaves and secured to said arm ends sliding in said tracks, and worm driven winches secured to said cables.

4. The canopy of claim 3 in which the sheaves at one end of each of said tracks are higher than the sheaves at the other end of each of said tracks; whereby said cables slant with respect to said tracks.

5. A sound projecting shell comprising, a trailer body open at one side and closed at the other, a ceiling in said trailer body slanting upward toward the open side, a roof over said ceiling extending substantially parallel to said ceiling, a nonporous sound reflecting beam extending lengthwise of the underside of said ceiling, said beam being of V-cross section, fixed risers in said trailer, and a plurality of independently movable risers engaged with and positioned adjacent to said fixed risers selectively to form a variety of staging.

6. The sound projecting shell of claim 5 in which a canopy is hinged to the top of the open side of said trailer body, arms pivoted to said canopy and slidably secured to said trailer body, means for sliding the slidably secured ends of said arms selectively to raise and lower said canopy, a V in cross section beam of non-porous, sound reflecting material secured to and extending lengthwise of the underside of said canopy.

7. A sound projecting shell comprising, a trailer body open at one side, a ceiling in said trailer body slanting upward toward the open side, a beam extending lengthwise of the underside of said ceiling, said beam being of V-cross section, fixed risers in said trailer, a plurality of movable risers associated with said fixed risers selectively to form a variety of staging, a canopy hinged to said trailer body at the top of the open side thereof, means secured to said canopy and said trailer body to open and close said canopy selectively, a V in cross section beam secured to the underside and extending lengthwise of said canopy, said opening and closing means comprising arms pivoted to said canopy, tracks secured to said trailer body, said arms also sliding in said tracks, cables secured to the arms nearer to their sliding connection to said tracks, guide sheaves for said cables to guide them along said tracks and a worm driven winch secured to said cable for moving said cable positively in two directions.

8. The sound projecting shell of claim 7 in which the sheaves at one end of said tracks are higher than the sheaves at the other; whereby cable reeved over said sheaves slants with respect to said tracks.

References Cited by the Examiner

UNITED STATES PATENTS

| | | | |
|---|---|---|---|
| 1,156,693 | 10/1915 | Koger | 20—2 X |
| 1,219,443 | 3/1917 | Dixon | 105—447 |
| 1,238,228 | 8/1917 | Weil | 20—1.123 X |
| 1,444,156 | 2/1923 | Kemp | 105—447 |
| 1,619,063 | 3/1927 | Ewertz. | |
| 1,726,499 | 8/1929 | Norris | 181—30 X |
| 2,146,668 | 2/1939 | Baade | 105—447 |
| 2,155,876 | 4/1939 | Stout | 20—2 |
| 2,493,258 | 1/1950 | Massare | 296—23 |
| 2,538,736 | 1/1951 | Spencer | 20—2X |
| 2,551,207 | 5/1951 | Ensor | 296—23 |
| 2,672,582 | 3/1954 | Hahn | 268—59 |
| 2,753,440 | 7/1956 | Wakefield | 50—101 |
| 2,890,498 | 6/1959 | Bigelow | 20—2 |
| 2,954,260 | 9/1960 | Wright | 20—2X |

FOREIGN PATENTS

| | | |
|---|---|---|
| 154,709 | 1/1954 | Australia. |
| 644,431 | 6/1928 | France. |
| 804,129 | 4/1951 | Germany. |
| 351,947 | 6/1931 | Great Britain. |
| 687,623 | 2/1953 | Great Britain. |

JACOB L. NACKENOFF, *Primary Examiner.*

WILLIAM I. MUSHAKE, HENRY C. SUTHERLAND, BENJAMIN BENDETT, *Examiners.*